(12) United States Patent
Kozaki et al.

(10) Patent No.: US 9,065,309 B2
(45) Date of Patent: Jun. 23, 2015

(54) MAGNETIC LEVITATION TYPE VACUUM PUMP AND MAGNETIC LEVITATION DEVICE

(71) Applicant: SHIMADZU CORPORATION, Kyoto (JP)

(72) Inventors: Junichiro Kozaki, Kyoto (JP); Yoshihiro Nagano, Kyoto (JP); Masaki Ofuji, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 389 days.

(21) Appl. No.: 13/678,561

(22) Filed: Nov. 16, 2012

(65) Prior Publication Data

US 2013/0147296 A1 Jun. 13, 2013

(30) Foreign Application Priority Data

Dec. 8, 2011 (JP) ................................. 2011-268973
Sep. 21, 2012 (JP) ................................. 2012-207762

(51) Int. Cl.
*H02K 7/09* (2006.01)
*F16C 32/04* (2006.01)
*F04D 19/04* (2006.01)
*F04D 29/058* (2006.01)

(52) U.S. Cl.
CPC ........ *H02K 7/09* (2013.01); *F04D 19/04* (2013.01); *F16C 32/0444* (2013.01); *F04D 29/058* (2013.01)

(58) Field of Classification Search
CPC ......... H02K 7/09; F04D 29/058; F04D 19/04; F04D 19/042; F16C 32/0444; F16C 32/0446; F16C 32/0448
USPC ................................ 310/90.5, 68 B; 361/144
See application file for complete search history.

(56) References Cited

U.S. PATENT DOCUMENTS 3,823,990 A * 7/1974 Gilinson, Jr. ................. 310/90.5
6,326,712 B1 * 12/2001 Nakazawa et al. ........... 310/90.5

(Continued)

FOREIGN PATENT DOCUMENTS

JP 6-313426 11/1994
JP 2003-222096 8/2003

OTHER PUBLICATIONS

"First Office Action of China Counterpart Application", issued on Feb. 3, 2015, with English translation thereof, pp. 1-20.

*Primary Examiner* — Burton Mullins
(74) *Attorney, Agent, or Firm* — Jianq Chyun IP Office

(57) ABSTRACT

A magnetic levitation type vacuum pump includes an electromagnet magnetically levitating a rotor by a magnetic force, an electromagnet driving circuit supplying an electromagnet current including a magnetic levitation control current component and a carrier wave current component having a frequency band higher than the magnetic levitation control current component to the electromagnet coil, a levitated position detecting circuit detecting the carrier wave current component and generating a levitated position signal of the rotor, a magnetic levitation control circuit inputting a current command of the magnetic levitation control current component to the electromagnet driving circuit based on the levitated position signal. The electromagnet coil has a primary coil and a secondary coil connected in parallel with the primary coil. An interrupting circuit connected in series with the secondary coil for the carrier wave current component passing therethrough and interrupting the magnetic levitation control current component is further included.

11 Claims, 11 Drawing Sheets

(56) References Cited

U.S. PATENT DOCUMENTS

| | | |
|---|---|---|
| 7,091,641 B2 * | 8/2006 | Kawashima et al. ........ 310/90.5 |
| 7,525,784 B2 * | 4/2009 | Kozaki .......................... 361/139 |
| 2007/0195479 A1 | 8/2007 | Tremaudant et al. |
| 2007/0278884 A1 * | 12/2007 | Kozaki et al. ................ 310/90.5 |
| 2009/0189469 A1 * | 7/2009 | Barada et al. ................ 310/90.5 |

* cited by examiner carrier wave frequency band (f2)

magnetic levitation control
frequency band (f1)

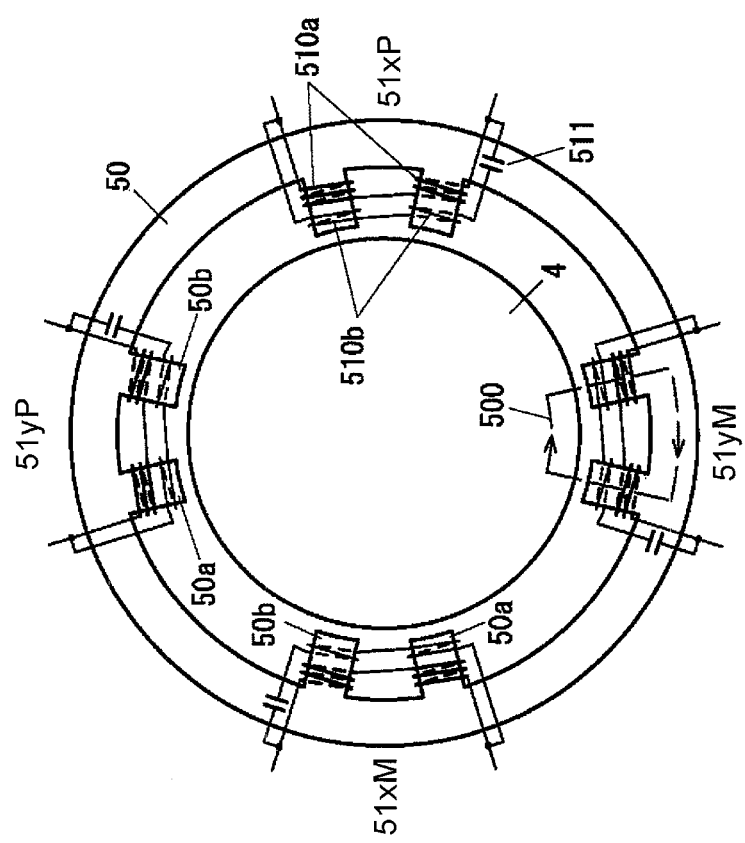

MAGNETIC LEVITATION TYPE VACUUM PUMP AND MAGNETIC LEVITATION DEVICE

CROSS-REFERENCE TO RELATED APPLICATION

This application claims the priority benefit of Japan application serial no. 2011-268973, filed on Dec. 8, 2011 and Japan application serial no. 2012-207762, filed on Sep. 21, 2012. The entirety of each of the above-mentioned patent applications is hereby incorporated by reference herein and made a part of this specification.

BACKGROUND OF THE INVENTION

1. Field of the Invention

The present invention relates to a magnetic levitation type vacuum pump and a magnetic levitation device.

2. Description of Related Art

In a turbo molecular pump in which the rotor is magnetically levitated by using a superimposed sensorless magnetic levitation device, a carrier wave of higher frequency whose frequency band is subject to a magnetically levitation control is superimposed to a driving current of the electromagnet for magnetic levitation so that the distance between the electromagnet and the rotor is measured from the voltage value, the current value and so on of said carrier wave (e.g., Japan Patent Publication No. 1994-313426).

When the coil turns are reduced in order to improve the coil characteristics (e.g., loss due to inductance, distributed capacitance regarding to inductance) regarding (e.g., loss due to inductance, distributed capacitance regarding to inductance) regarding to the carrier wave as well as in order to increase the carrier wave current, it may lead to a problem that the magnetic levitation control is affected since the desired magnetic levitation force cannot be obtained, etc. In such condition, in order to obtain the desired magnetic levitation force, it is necessary to increase the electromagnet current; thus the increase of power necessary for the magnetic levitation is resulted. Since a plurality of vacuum pumps are disposed in a semiconductor manufacturing device, the increase of power of vacuum pumps leads to an increase in power of the entire semiconductor manufacturing device and it is not preferred from the viewpoint of energy conservation.

On the other hand, in the case that the supported body is levitated by a small electromagnet current, it is necessary to increase the coil turns of the electromagnet. However, if the coil turns of the electromagnet is increased, the carrier wave current component (the current component corresponding to the carrier wave signal) is decreased and the position measurement of the supported body which uses the carrier wave becomes harder. In addition, the deterioration of the coil characteristics at high frequencies cannot be neglected.

SUMMARY OF THE INVENTION

In a preferable embodiment, the magnetic levitation type vacuum pump includes a rotor in which an exhausting unit is formed, a motor for rotationally driving the rotor, an electromagnet magnetically levitating the rotor by a magnetic force and having an electromagnet coil wound around a core, an electromagnet driving circuit supplying an electromagnet current to the electromagnet coil, wherein the electromagnet current includes a magnetic levitation control current component for magnetically levitating the rotor and a carrier wave current component having a frequency band higher than the magnetic levitation control current component and for detecting the levitated position of the rotor, a levitated position detecting circuit for detecting the carrier wave current component and generating a levitated position signal of the rotor, and a magnetic levitation control circuit for inputting a current command of the magnetic levitation control current component to the electromagnet driving circuit based on the levitated position signal. The electromagnet coil has a primary coil and a secondary coil connected in parallel with the primary coil. An interrupting circuit connected in series with the secondary coil for the carrier wave current component passing therethrough and for interrupting the magnetic levitation control current component is further included.

According to an exemplary embodiment, an inductance of the secondary coil is set to be smaller than an inductance of the primary coil.

According to an exemplary embodiment, the interrupting circuit has a capacitor, wherein the inductance of the primary coil is $L_M$, a frequency of the magnetic levitation control current component is $f_1$, a frequency of the carrier wave current component is $f_2$, a capacitance C of the capacitor is set to satisfy an equation "$(1/2\pi f_1 C) > 2\pi f_1 L_M$" and an equation "$(1/2\pi f_2 C) < 2\pi f_2 L_M$".

According to an exemplary embodiment, A represents a ratio $f_2/f_1$ of the frequency $f_2$ to the frequency $f_1$, and an impedance $Z_{C1}$ of the capacitor at the frequency $f_1$ and an impedance $Z_{S1}$ of the secondary coil are set to satisfy an equation "$Z_{C1} < A^2 \cdot Z_{S1}$".

According to an exemplary embodiment, a resistor connected in series with the capacitor is further included.

In another preferable embodiment, the magnetic levitation type vacuum pump includes an electromagnet magnetically levitating a supported body by a magnetic force and having an electromagnet coil wound around a core, an electromagnet driving circuit supplying an electromagnet current to the electromagnet coil, wherein the electromagnet current includes a magnetic levitation control current component for magnetically levitating the supported body and a carrier wave current component having a frequency band higher than the magnetic levitation control current component and for detecting the levitated position of the supported body, a levitated position detecting circuit for detecting the carrier wave current component and generating a levitated position signal of the supported body, and a magnetic levitation control circuit for inputting a current command of the magnetic levitation control current component to the electromagnet driving circuit based on the levitated position signal. The electromagnet coil has a primary coil and a secondary coil connected in parallel with the primary coil. An interrupting circuit connected in series with the secondary coil for the carrier wave current component passing therethrough and for interrupting the magnetic levitation control current component is further included.

Effects of the Invention

According to the exemplary embodiments of the present invention, the carrier wave current component can be increased while suppressing the effect on the magnetic levitation control.

BRIEF DESCRIPTION OF THE DRAWINGS

The accompanying drawings are included to provide a further understanding of the invention, and are incorporated in and constitute a member of this specification. The drawings illustrate embodiments of the invention and, together with the description, serve to explain the principles of the invention.

FIG. 7 schematically illustrates the electromagnets 51xP, 51xM, 51yP, 51yM in the case that a ring-shaped core 50 is used.

DESCRIPTION OF THE EMBODIMENTS

Figure 1:
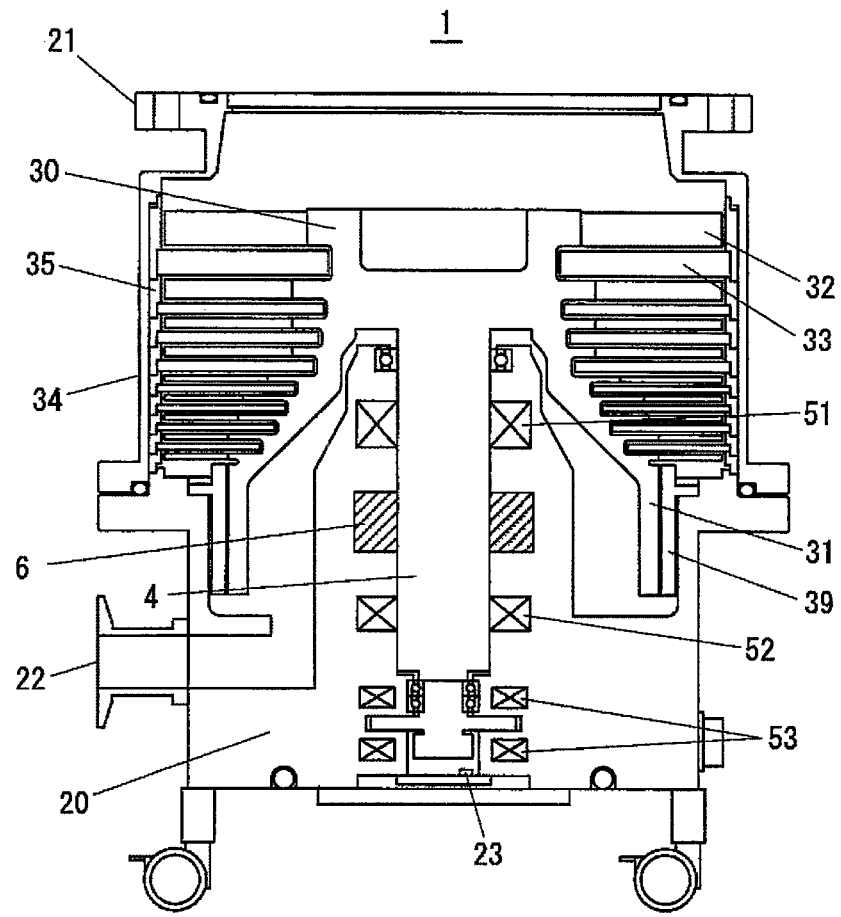
FIG. 1 is a schematic cross-sectional view of a magnetic levitation type turbo molecular pump according to an exemplary embodiment of the present invention.

An exemplary embodiment according to the present invention is described in the following with reference to the accompanying drawings. FIG. 1 is a schematic cross-sectional view of the magnetic levitation type turbo molecular pump adapted to a sensorless magnetic levitation device according to an exemplary embodiment of the present invention. As shown in FIG. 1, the turbo molecular pump includes a pump unit 1 and a control unit (not shown) for driving the pump unit 1. The control unit connected to the pump unit 1 includes a magnetic bearing control section and a motor driving control section for rotationally driving the motor 6.

The rotor 30 is supported in a non-contact manner by a 5-axis control type magnetic bearing that includes radial magnetic bearings 51, 52 and axial magnetic bearings 53. The magnetically levitated rotor 30 which is rotatable by a magnetic bearing is rotationally driven in high speed by the motor 6. For example, a DC brushless motor is used as the motor 6. The revolution of the rotor 30 is detected by using the revolution sensor 23.

In the rotor 30, multi-stage rotor vanes 32 and a cylindrical bolt rotor 31 are formed as an exhausting function section. On the other hand, at the fixing side, multi-stage stator vanes 33 alternately disposed with the rotor vanes 32 in the axial direction and a cylindrical bolt stator 39 disposed at the outer peripheral side of the bolt rotor 31 are formed as an exhausting function section. The stator vanes 33 are sandwiched between the pairs of spacer rings 35 along the axial direction, respectively.

An exhausting port 22 is disposed at the base 20 and a back pump is connected to the exhausting port 22. By rotationally driving in a high speed by using the motor while magnetically levitating the rotor 30, gas molecules at the side of inlet 21 are exhausted to the side of exhausting port 22.

Figure 2:
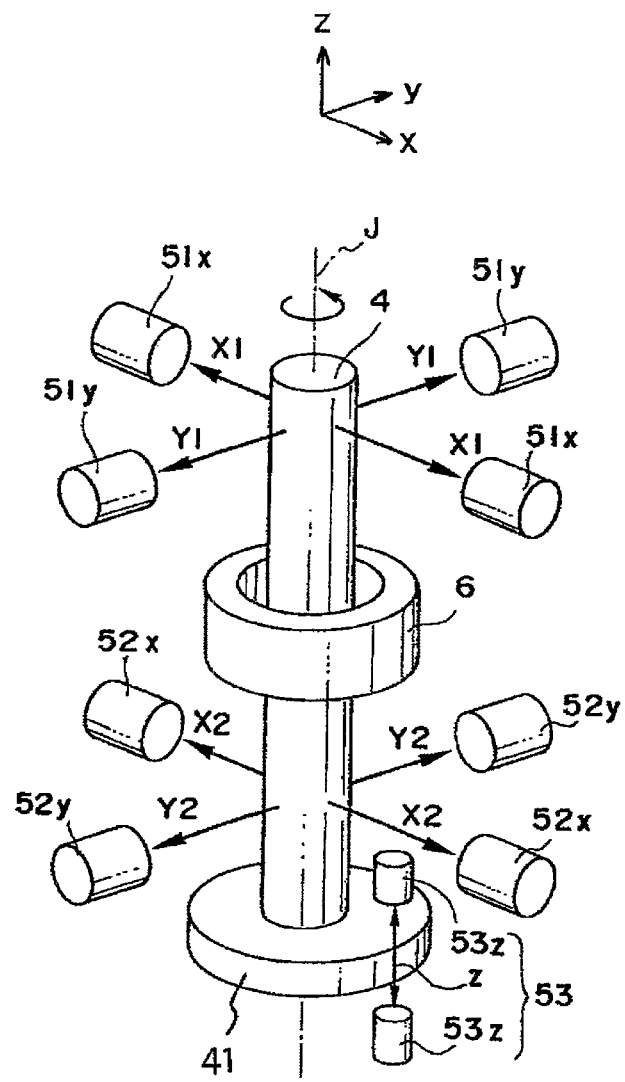
FIG. 2 is a schematic view of a 5-axis control type magnetic bearing.

FIG. 2 is a schematic view showing a structure of a 5-axis control type magnetic bearing. The rotation axis J of the rotor shaft 4 disposed at the rotor 30 is illustrated to be consistent with z axis. The radial magnetic bearings 51 shown in FIG. 1 include a pair of electromagnets 51x with respect to x axis and a pair of electromagnets 51y with respect to y axis. Similarly, the radial magnetic bearings 52 include a pair of electromagnets 52x with respect to x axis and a pair of electromagnets 52y with respect to y axis. In addition, the pair of electromagnets 53z disposed at the axial magnetic bearings 53 are oppositely disposed and sandwich the disc 41 disposed at the bottom of the rotor shaft 4 along z axis.

Figure 3:
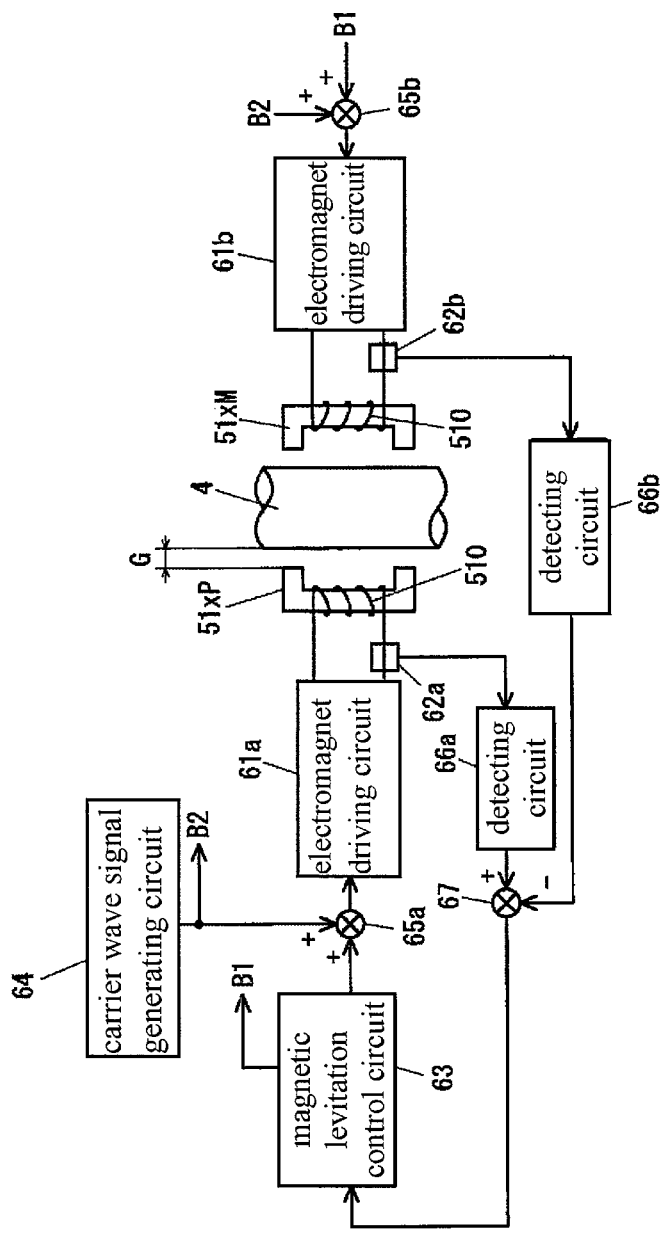
FIG. 3 is a block diagram illustrating the control of the electromagnet 51x.

FIG. 3 illustration a portion of the control device which controls the magnetic bearings shown in FIG. 2, wherein one axis of the five axes, specifically with respect to a pair of electromagnets 51x, is illustrated. In the structure shown in FIG. 3, signals from the current detecting circuits 62a, 62b are respectively detected by the detecting circuits 66a, 66b, the signals output from the detecting circuits 66a, 66b are input to the differentiator 67, and a differential signal is obtained. However, the signals from the current detecting circuits 62a, 62b can also be detected (not shown) by the detecting circuits after the differential signal is obtained from the differentiator 67. The pair of electromagnets 51x is illustrated as electromagnet 51xP and electromagnet 51xM and disposed to sandwich the rotor shaft 4 therebetween. Electromagnet coils 510 are wound around the electromagnets 51xP and 51xM, respectively. The present embodiment is characterised by the configuration of the electromagnet coils 510. The detail of the electromagnet coils 510 is described later. The configuration of other components is the same as the conventional sensorless magnetic levitation device, thus a detailed description thereof is omitted.

An electromagnet current is supplied to the electromagnet 51xP from the electromagnet driving circuit 61a, and an electromagnet current is supplied to the electromagnet 51xM from the electromagnet driving circuit 61b. The structures of electromagnet driving circuits 61a, 61b are the same. The magnetic levitation device of the present embodiment is a sensorless type electromagnetic levitation device, and the electromagnet currents supplied to the electromagnets 51xP, 51xM includes an electromagnetic levitation control current component for levitating the rotor 30 to a predetermined position by the magnetic force of the electromagnets 51xP, 51xM and a carrier wave current component for detecting the levitated position of the rotor shaft 4. The frequency band of the carrier wave current component is set to be higher than the frequency band of the magnetic levitation control current component. For instance, the frequency band of the magnetic levitation control current component is set to be several kHz (1 to 2 kHz) and the frequency band of the carrier wave current component is set to be 10 kHz.

If the gap G between the rotor shaft 4 and the electromagnet 51xP, 51xM is changed, then the inductance of the electromagnet coil 510 is changed. In the magnetic levitation device of the present embodiment, the inductance variation is detected as the amplitude variation of the carrier wave current component so as to control the levitated position of the rotor shaft 4. The currents flowing in the electromagnet coil 510 of the electromagnets 51xP, 51xM are detected by the current detecting circuits 62a, 62b. The current detection signals output from each of the current detecting circuits 62a, 62b are respectively input to the detecting circuits 66a, 66b. The carrier wave current component is extracted from the current detection signals at each detecting circuit 66a, 66b, and a position signal based on a modulation signal of the carrier wave current component is generated.

The differentiator 67 generates a difference between the position signals (gap signal) respectively output from the detecting circuits 66a, 66b. For instance, in the case that the rotor shaft 4 is levitated to an intermediate position of the electromagnet 51xP and the electromagnet 51xM, i.e., a central position of the magnetic bearings, the differential signal is set to be zero. Moreover, the differential signal when the rotor shaft 4 approaches to the electromagnet 51xP is set to be a minus value, and the differential signal when the rotor shaft 4 approaches to the electromagnet 51xM is set to be a plus value, for example.

The differential signal output from the differentiator 67 is fed back to the magnetic levitation control circuit 63. The magnetic levitation control circuit 63 outputs a current command signal in order to control the magnetic levitation control current component based on the fed back differential signal and the position command. The carrier wave signal generated at the carrier wave signal generating circuit 64 is added (superimposed) to the current command signal at the adding section 65a. The electromagnet driving circuit 61a supplies the electromagnet current based on the added signal to the electromagnet 51xP. On the other hand, as for the adding section 65b with respect to the electromagnet 51xM at the opposite side, the adding of the current command signal B1 output from the magnetic levitation control circuit 63 and the carrier wave signal B2 generated by the carrier wave signal generating circuit 64 is also performed, and the added signal is input to the electromagnet driving circuit 61b. For example, in the case that the current command signal regarding to the electromagnet 51xP is a command to increase current, the current command signal B1 regarding to the electromagnet 51xM may become a command to reduce current.

Figure 8:
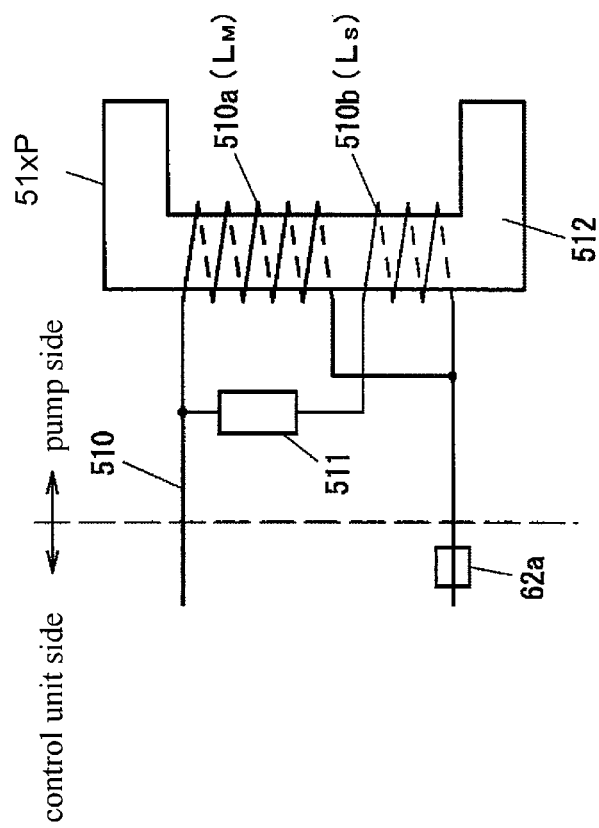
FIG. 8 schematically illustrates the structure of electromagnet coil 510 wound around the core 512 of the electromagnet 51xP.

FIG. 8 illustrates the structure of the electromagnet coil 510 wound around the core 512 of the electromagnet 51xP. In addition, since the electromagnet coil 510 of the electromagnet 51xM is the same as the electromagnet 51xP, the electromagnet 51xP is described as an example herein. In addition to the conventional primary coil 510a, the electromagnet coil 510 further includes a secondary coil 510b, and an interrupting circuit 511 is connected in series with the secondary coil 510b. In other words, a series circuit of the secondary coil 510 and the interrupting circuit 511 is connected in parallel to the primary coil 510a. The interrupting circuit 511 has a function as a filter that lets the carrier wave current component to pass through and as well as interrupts the magnetic levitation control current component. Passive filters and active filters capable to function actively can be used in the interrupting circuit 511.

Figure 6A:
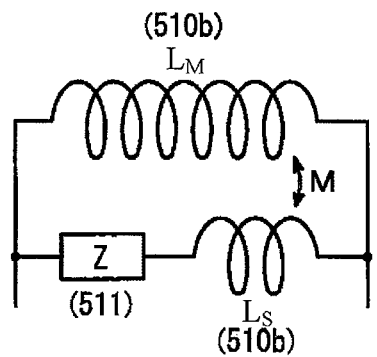
FIG. 6A to FIG. 6C illustrate the functions of the interrupting circuit 511 and the secondary coil 510b.
Figure 6B:
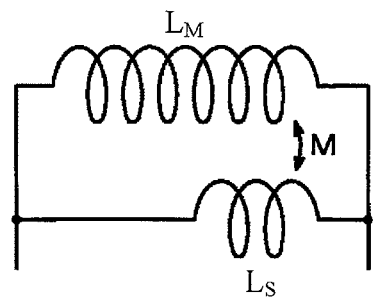
Figure 6C:
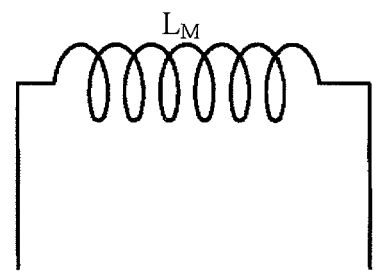

FIG. 6A to FIG. 6C illustrate the functions of the interrupting circuit 511 and the secondary coil 510b. FIG. 6A is the circuit diagram of the electromagnet coil 510, FIG. 6B shows the equivalent circuit regarding to the carrier wave current component, and FIG. 6C shows the equivalent circuit regarding to the magnetic levitation control current component. As described above, the interrupting circuit 511 is a circuit which lets the carrier wave current component to pass through and as well as interrupts the magnetic levitation control current component. Therefore, at the frequency band including the frequency $f_1$ of the magnetic levitation control current component, it can be substantially regarded as the circuit shown in FIG. 6C. On the other hand, at the frequency band including the frequency $f_2$ of the carrier wave current component, if the impedance Z of the interrupting circuit 511 regarding to the carrier wave current component is set to be sufficiently lower than the impedance of the secondary coil 510b, it can be substantially regarded as the circuit shown in FIG. 6B.

Figure 4:
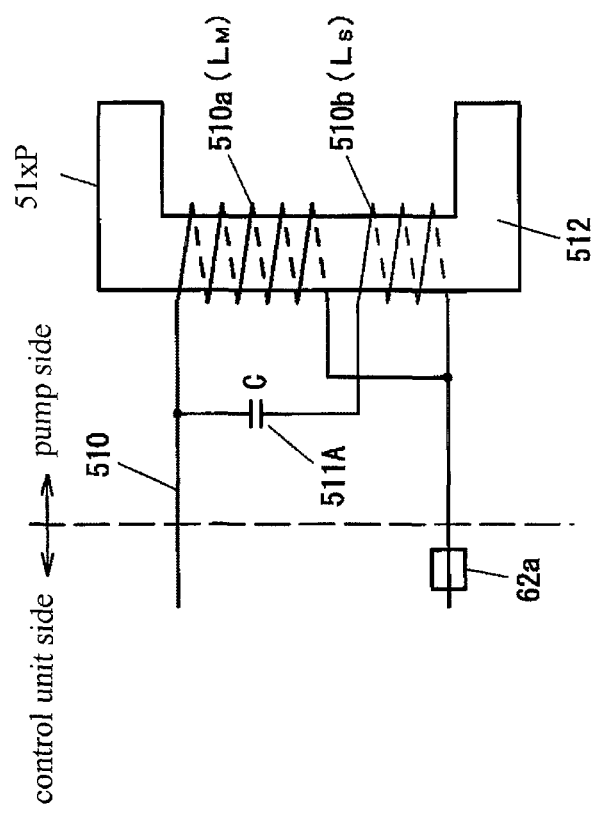
FIG. 4 illustrates that a capacitor 511A is used in the interrupting circuit 511.

FIG. 4 illustrates a condition that a capacitor 511A is used as the interrupting circuit 511. In addition to the conventional primary coil 510a, the electromagnet coil 510 further includes a circuit in which a secondary coil 510b and a capacitor 511A are connected in series. The primary coil 510a and the secondary coil 510b are wound around the core 512, and the series circuit of the secondary coil 510b and the capacitor 511A is connected in parallel with the primary coil 510a.

The coil turns of the secondary coil 510b is set to be equal to or less than the coil turns of the primary coil 510a. The inductance $L_M$ of the primary coil 510a and the inductance $L_S$ of the secondary coil 510b are set to be "$L_M \geq L_S$". In addition, the capacitance C of the capacitor 511A is set so that the impedance of the capacitor 511A is greater than the impedance of the primary coil 510a at the frequency band of the magnetic levitation control current component and is less than the impedance of the primary coil 510a at the frequency band of the carrier wave current component. In other words, regarding to the frequency $f_1$ of the magnetic levitation control current component and the frequency $f_2$ of the carrier wave current component, the capacitance C is set to satisfy Equation (1) and Equation (2).

$$(1/2\pi f_1 C) > 2\pi f_1 L_M \qquad (1)$$

$$(1/2\pi f_2 C) < 2\pi f_2 L_M \qquad (2)$$

For example, the condition in which $f_1=1$ kHz, $f_2=10$ kHz, at the magnetic levitation control ($f_1=1$ kHz), the impedance $Z_{M1}$ of the primary coil 510a, $Z_{M1}=Z$, and the impedance $Z_{S1}$ of the secondary coil 510b, $Z_{S1}=0.7Z$ is considered. Since $f_2=10 \cdot f_1$, regarding to the carrier wave current component, the impedance $Z_{M2}$ of the primary coil 510a and the impedance $Z_{S2}$ of the secondary coil 510b become $Z_{M2}=10Z$, $Z_{S2}=7Z$. On the other hand, the impedance $Z_{C1}$, $Z_{c2}$ of the capacitor 511A at the frequency $f_1$, $f_2$ has the relationship of $Z_{C1}=10Z_{C2}$.

Figure 5A:
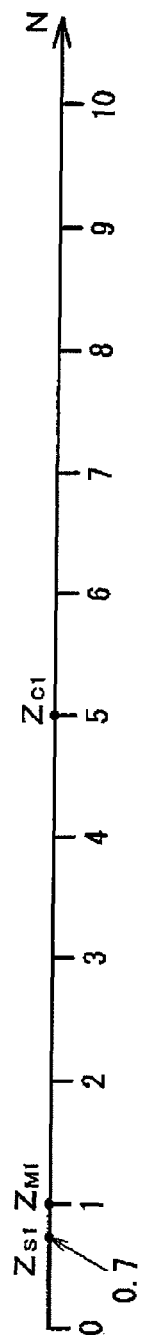
FIG. 5A and FIG. 5B are diagrams illustrating the relationship between the magnitudes of impedance.
Figure 5B:
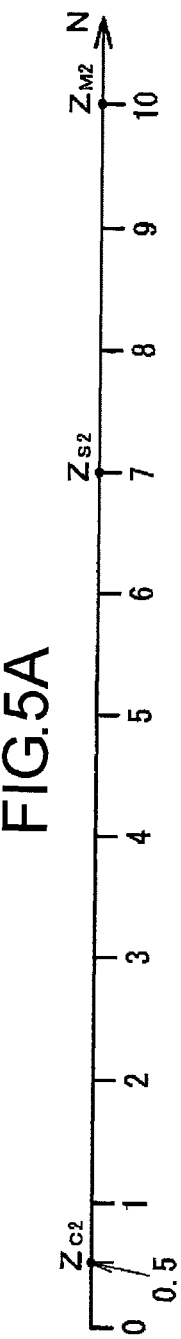

Herein when the impedance $Z_{C1}$ of the capacitor 511A at frequency $f_1$ is set to be $Z_{C1}=5Z$, then $Z_{C2}=0.5Z$. At this time, since $Z_{C1}$ (=5Z)>$Z_{M1}$ (=Z) and $Z_{C2}$ (=0.5Z)<$Z_{M2}$ (=10Z), the abovementioned Equation (1) and Equation (2) are satisfied. In FIG. 5A and FIG. 5B, the impedance $Z_{M1}$, $Z_{S1}$, $Z_{C1}$ at frequency $f_1$ and the impedance $Z_{M2}$, $Z_{S2}$, $Z_{C2}$ at frequency $f_2$ are shown on the number line and the relationship thereof are easy to understand. The horizontal axis is N when the impedance is described as N·Z.

At the frequency band (f1) of the magnetic levitation control current component, the impedance $Z_{C1}$ of the capacitor 511A as shown in FIG. 5A is set to be greater than the impedance $Z_{M1}$ of the primary coil 510a. Therefore, the coil circuit is as shown in the equivalent circuit of FIG. 6C, and the magnetic levitation control current component can hardly flow through the line of secondary coil 510b at which the capacitor 511A is disposed. Accordingly, at the frequency band (f1) of the magnetic levitation control (magnetic levitation control frequency band f1), the impedance $Z_T$ of the entire coil circuit is substantially equal to the impedance $Z_M$ (=j$\omega L_M$) of the primary coil 510a.

On the other hand, at the frequency band including frequency $f_2$ of the carrier wave current component, since the impedance $Z_{C2}$ of the capacitor 511A as shown in FIG. 5B is set to be smaller than the impedance $Z_{M2}$ of the primary coil 510a, the carrier wave current component can flow through both the line of primary coil 510a and the line of secondary coil 510b. Furthermore, since the impedance $Z_2$ of the capacitor 511A at the frequency band of the carrier wave current component is smaller than the impedance $Z_{S2}$ of the secondary coil 510b, regarding to the carrier wave current component at the frequency band including frequency $f_2$ (carrier wave frequency band f2), the equivalent circuit shown in FIG. 6B can be considered.

Additionally, referring to FIG. 5A and FIG. 5B, in the case of $f_2=A \cdot f_1$, if the inductance $L_S$ of the secondary coil 510b and the capacitance C of the capacitor 511A are set by $Z_{C1} < A^2 \cdot Z_{S1}$, then $Z_2 < Z_{S2}$ can be determined. In other words, when the impedance of the capacitor 511A is set to be smaller than the impedance of the secondary coil 510b, the entire coil circuit can be considered as the equivalent circuit as shown in FIG. 6B. Moreover, by setting in such manner, while Equation (1) and Equation (2) are satisfied, the impedance of the entire coil circuit can be set smaller.

In the case of the equivalent circuit shown in FIG. 6B, if the mutual inductance of the primary coil 510a and the secondary coil 510b is M, the impedance $Z_T$ of the entire coil circuit can be illustrated as Equation (3).

$$Z_T = j\omega \cdot (L_M \cdot L_S - M^2)/(L_M + L_S - 2M) \quad (3)$$

In general, since "$L_M \cdot L_S > M^2$" and "$L_M + L_S > 2M$" are satisfied, in the case that the values are set as in Equation (4), the impedance $Z_T$ of the entire coil circuit becomes the value described in Equation (5).

$$L_M = L, L_S = 0.7L, M = 0.8L \quad (4)$$

$$Z_T = 0.6j\,\omega L \quad (5)$$

As shown in Equation (5), in the present embodiment, the impedance $Z_T$ of the entire coil circuit regarding to the carrier wave current component is comparatively smaller than the case of conventional single primary coil. At the current detecting circuit 62a shown in FIG. 4, not only the carrier wave current component which flows through the secondary coil 510b is detected, but also the carrier wave current component which flows through the primary coil 510a is detected. Thus, both carrier wave current components can be used to detect the rotor position. In other words, in the present embodiment, when the carrier wave current component which flows through the electromagnet coil 510 is set to be greater than that of the conventional design, the S/N ratio of the signal fed back to the magnetic levitation control circuit 63 can be increased.

In addition, as described above, since almost just the carrier wave current component flows through the secondary coil 510b, the thickness of the secondary coil 510b can be set comparatively thinner than the primary coil 510a. Therefore, the space for winding the secondary coil 510b to the core 512 can be decreased. Moreover, it can be seen from FIG. 4, though a parallel circuit of the primary coil 510a and the secondary coil 510b is at the electromagnet, at the portion to be pulled to the atmosphere from the pump body, the connector for connecting between the vacuum and atmosphere is unnecessary to change, wherein the extracted wires of the connector can be two, similar to the conventional design.

Figure 9:
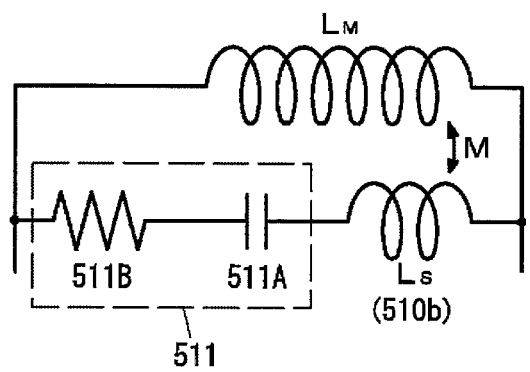
FIG. 9 is a diagram of the interrupting circuit 511 of another exemplary embodiment.
Figure 10:
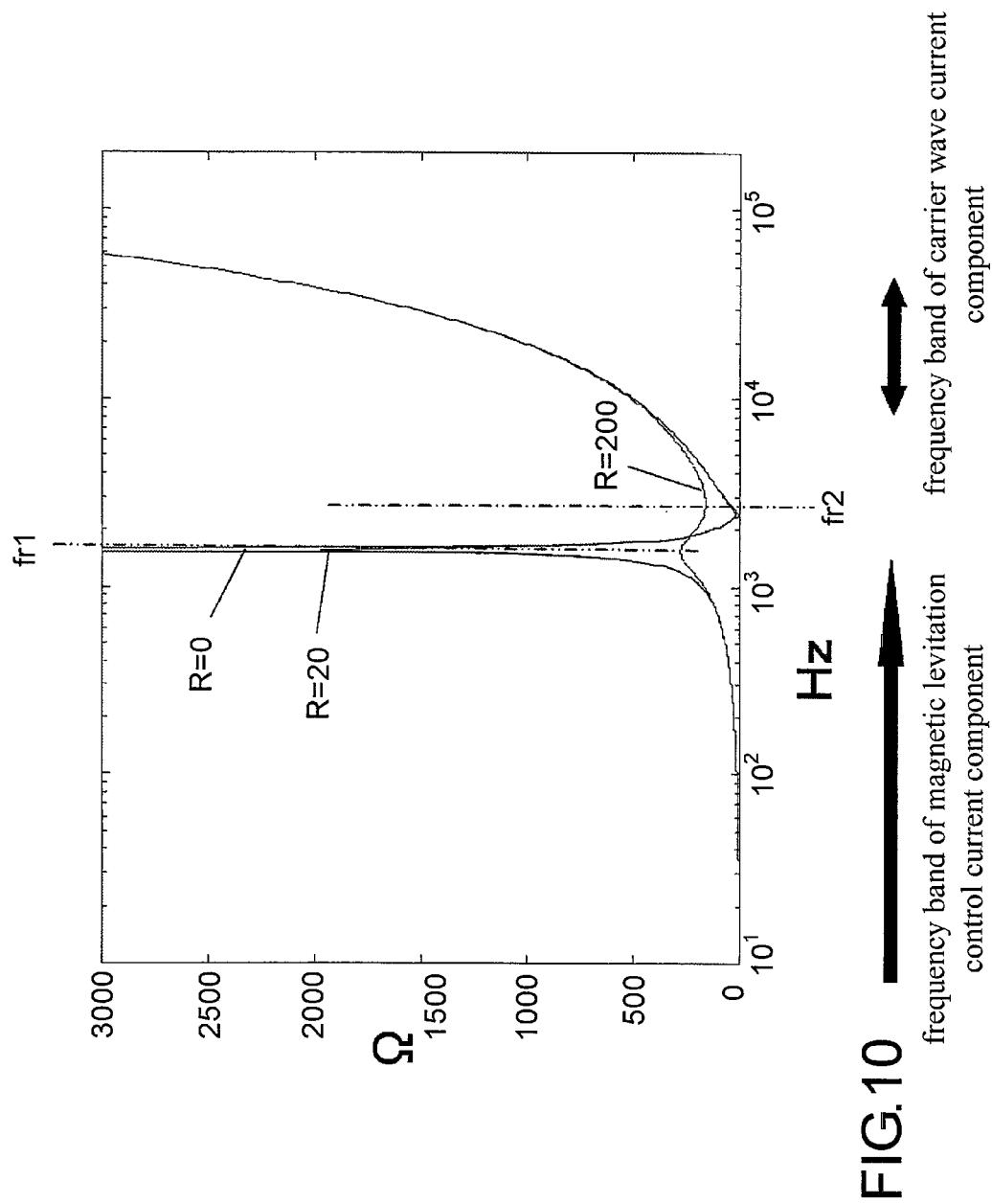
FIG. 10 illustrates the effect of resonant frequencies fr1, fr2 and the resistor.

FIG. 9 shows the interrupting circuit 511 of another exemplary embodiment. Herein the capacitor 511A and the resistor 511B are connected in series to the secondary coil 510b. As described above, in the case of the interrupting circuit 511 of FIG. 6A being the capacitor 511A of FIG. 4, resonance occurs at frequencies fr1, fr2 as shown in FIG. 10. In FIG. 10, the vertical axis shows the impedance of the entire electromagnet coil, and the horizontal axis shows the frequency, wherein fr1 is the frequency of parallel resonance and fr2 is the frequency of series resonance.

As described above, in the case that the frequency band of the magnetic levitation control current component is set to be several kHz (1 kHz to 2 kHz), the frequency band of the carrier wave current component is set to be 10 kHz, the frequency of parallel resonance fr1 may exist near the upper limit of the frequency band of the magnetic levitation control current component, thus the stability of magnetic levitation control may be affected. Herein as shown in FIG. 9, the capacitor 511A and the resistor 511B are disposed in parallel, so that the peak of impedance at the series resonance can be reduced. As a result, the stability of the magnetic levitation control can be improved. In the example shown in FIG. 10, the cases of resistance R of the resistor 511B being 20Ω and 200Ω are shown. When R=20Ω, the peak value of the parallel resonance point (fr1) can be significantly reduced, and the impedance at the series resonance point (fr2) is significantly increased.

Moreover, a C-shaped core 512 is used in the electromagnet 51xP shown in FIG. 4 and FIG. 8, a ring-shaped core 51 can also be used as shown in FIG. 7. Four pairs of one-to-one magnetic pole sections 50a, 50b that protrude at the inner diameter side of the core 50 are formed, and each electromagnet 51xP, 51xM, 51yP, 51yM consists of a one-to-one pair of magnetic pole sections 50a, 50b. A primary coil 510a and a secondary coil 510b are wound around each of the magnetic poles 50a, 50b. The primary coils 510a of the magnetic poles 50a, 50b are connected in series so as to generate a magnetic flux shown as the dashed line 500. Similarly, the secondary coils 510b of the magnetic poles 50a, 50b are connected in series so as to generate a magnetic flux shown as the dashed line 500.

As described above, the present embodiment includes the electromagnet, the electromagnet driving circuit 61a, the levitated position detecting circuit and the magnetic levitation control circuit 63. The electromagnet is used for magnetically levitation in which the electromagnet coil 510 is wound around the core 512. The electromagnet driving circuit 61a supplies an electromagnet current to the electromagnet coil 510, wherein the electromagnet current includes a magnetic levitation control current component for magnetically levitating the rotor 30 which is a supported body, and a carrier wave current component having a frequency band higher than the magnetic levitation control current component and for detecting the levitated position of the rotor 30. The levitated position detecting circuit (the current detecting circuits 62a, 62b, the detecting circuits 66a, 660 and the differentiator 67) is for detecting the carrier wave current component and generating a levitated position signal of the rotor 30. The magnetic levitation control circuit 63 is for inputting a current command of the magnetic levitation control current component to the electromagnet driving circuit 61a based on the levitated position signal. The electromagnet coil 510 has a primary coil 510a and a secondary coil 510b connected in parallel with the primary coil 510a. The interrupting circuit 511 connected in series with the secondary coil 510b for the carrier wave current component passing therethrough and for interrupting the magnetic levitation control current component is further included.

Accordingly, though the disposing of primary coil 510a is the same as that of the conventional sensorless magnetic levitation device or the non-sensorless magnetic levitation device, since the carrier wave current component flows through the line of secondary coil 510b, the carrier wave current component can be increased to be larger than the conventional sensorless magnetic levitation device. As a result, the S/N ratio of the signal which is fed back to the magnetic levitation control circuit 63 can be increased.

Additionally, since the inductance of the secondary coil 510b is set to be equal to or less than the inductance of the primary coil 510a, the carrier wave current component at the secondary coil 510b is increased. Moreover, when the ratio $f_2/f_1$ of the frequency $f_2$ to frequency $f_1$ is A, by setting the impedance $Z_{C1}$ of the capacitor 511A at the frequency $f_1$ and the impedance $Z_{S1}$ of the secondary coil 510b to be "$Z_{C1} < A^2 \cdot Z_{S1}$", the effect of the capacitor 511A to the secondary coil ($L_S$) at the frequency $f_2$ can be reduced.

Furthermore, when the interrupting circuit 511 is configured with the capacitor 511A, it is preferable to set the capacitance C of the capacitor 511A to satisfy Equations "$(1/2\pi f_1 C) > 2\pi f_1 L_M$" and "$(1/2\pi f_2 C) < 2\pi f_2 L_M$" if the inductance of the primary coil 510a is set to be $L_M$ and the frequency of the magnetic levitation control current component is $f_1$ and the frequency of the carrier wave current component is $f_2$. In such simple configuration, the S/N ratio can be improved. At the frequency band of the magnetic levitation control, the magnetic levitation control current component of frequency $f_1$ that contributes to the levitation force merely flows through the primary coil 510a, and the magnetic levitation control can be performed the same way as the conventional. In other words, while the effect to the magnetic levitation control is suppressed, it is possible to increase the carrier wave current component.

In addition, in the case that the capacitor 511A is used as the interrupting circuit 511, though resonance phenomena are generated as shown in FIG. 10, by connecting the capacitor 511A and the resistor 511B in series, the peak of impedance at the time of resonance can be reduced. As a result, the effect of resonance, for example, the effect to the magnetic bearing control stability can be enhanced.

Furthermore, the above description is only an example and the present invention is not limited to above mentioned exemplary embodiments as long as the features of the present invention are not spoiled. For instance, though a radial magnetic bearing is described as an example in the above exemplary embodiment, the axial magnetic bearing can also be relatively adapted. In addition, not only the turbo molecular pump, but also a sensorless magnetic levitation device which is used in various apparatuses is adapted. In other words, in a sensorless magnetic levitation device, as shown in FIG. 11, the abovementioned shaft 4 can be replaced by a supported body 40.

Figure 11:
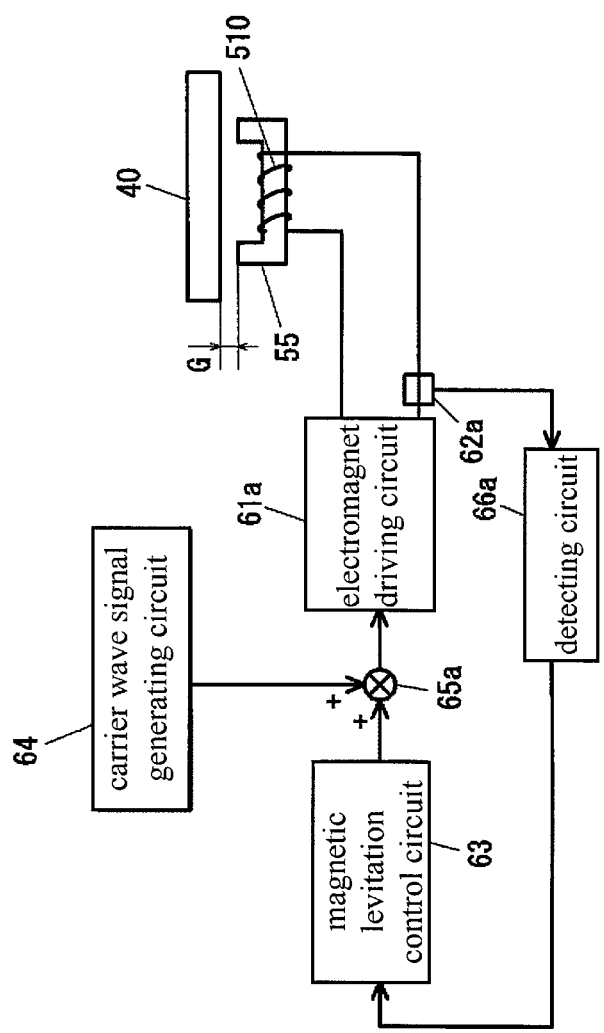
FIG. 11 is a block diagram illustrating the sensorless magnetic levitation device.

In FIG. 11, the supported body 40 is magnetically levitated and supported by the electromagnet 55. By changing the gap G (the levitated position) of the supported body 40 and the electromagnet 55, the inductance of electromagnet coil 510 is changed and the inductance variation is detected as the magnitude variation of the carrier wave current component. The current flowing through the electromagnet coil 510 of the electromagnet 55 is detected by the current detecting circuit 62a. The current detecting signal output from the current detecting circuit 62a is input to the detecting circuit 66a. By the detecting circuit 66a, the carrier wave current component is extracted from the current detecting signal and the position signal is generated based on the modulating signal of the carrier wave current component.

The position signal output from the detecting circuit 66a is fed back to the magnetic levitation control circuit 63. The magnetic levitation control circuit 63 outputs a current command signal so as to control the magnetic levitation control current component based on the fed back position signal and the position command. By the adding section 65a, the carrier wave signal generated by the carrier wave signal generating circuit 64 is added (superimposed) to the current command signal. The electromagnet driving circuit 61a supplies the electromagnet current based on the added-processed signal to the electromagnet 55.

Furthermore, the signal processing of the control circuit is not limited to analog, and digital processing is also applicable.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A magnetic levitation type vacuum pump, comprising:
   a rotor in which an exhausting unit is formed;
   a motor, rotationally driving the rotor;
   an electromagnet, magnetically levitating the rotor by a magnetic force and an electromagnet coil wound around a core;
   an electromagnet driving circuit, supplying an electromagnet current to the electromagnet coil, wherein the electromagnet current comprises a magnetic levitation control current component for magnetically levitating the rotor and a carrier wave current component having a frequency band higher than that of the magnetic levitation control current component and for detecting a levitated position of the rotor;
   a levitated position detecting circuit, detecting the carrier wave current component and generating a levitated position signal of the rotor;
   a magnetic levitation control circuit, inputting a current command of the magnetic levitation control current component to the electromagnet driving circuit based on the levitated position signal;
   wherein the electromagnet coil has a primary coil and a secondary coil connected in parallel with the primary coil, and
   an interrupting circuit connected in series with the secondary coil, the carrier wave current component passing therethrough and interrupting the magnetic levitation control current component.

2. The magnetic levitation type vacuum pump according to claim 1, wherein
   the interrupting circuit has a capacitor,
   an inductance of the primary coil is $L_M$, a frequency of the magnetic levitation control current component is $f_1$, a frequency of the carrier wave current component is $f_2$, a capacitance C of the capacitor is set to satisfy a relationship of "$(1/2\pi f_1 C) > 2\pi f_1 L_M$" and a relationship of "$(1/2\pi f_2 C) < 2\pi f_2 L_M$".

3. The magnetic levitation type vacuum pump according to claim 1, wherein
   an inductance of the secondary coil is set to be smaller than an inductance of the primary coil.

4. The magnetic levitation type vacuum pump according to claim 3, wherein
   the interrupting circuit has a capacitor,
   the inductance of the primary coil is $L_M$, a frequency of the magnetic levitation control current component is $f_1$, a frequency of the carrier wave current component is $f_2$, a capacitance C of the capacitor is set to satisfy a relationship of "$(1/2\pi f_1 C) > 2\pi f_1 L_M$" and a relationship of "$(1/2\pi f_2 C) < 2\pi f_2 L_M$".

5. The magnetic levitation type vacuum pump according to claim 2, wherein
   A represents a ratio $f_2/f_1$ of the frequency $f_2$ to the frequency $f_1$, an impedance $Z_{C1}$ of the capacitor at the frequency $f_1$ and an impedance $Z_{S1}$ of the secondary coil are set to satisfy a relationship of "$Z_{C1} < A^2 \cdot Z_{S1}$".

6. The magnetic levitation type vacuum pump according to claim 4, wherein
   A represents a ratio $f_2/f_1$ of the frequency $f_2$ to the frequency $f_1$, an impedance $Z_{C1}$ of the capacitor at the frequency $f_1$ and an impedance $Z_{S1}$ of the secondary coil are set to satisfy a relationship of "$Z_{C1}<A^2 \cdot Z_{S1}$".

7. The magnetic levitation type vacuum pump according to claim 2, wherein
a resistor is connected in series with the capacitor.

8. The magnetic levitation type vacuum pump according to claim 4, wherein
a resistor is connected in series with the capacitor.

9. The magnetic levitation type vacuum pump according to claim 5, wherein
a resistor is connected in series with the capacitor.

10. The magnetic levitation type vacuum pump according to claim 6, wherein
a resistor is connected in series with the capacitor.

11. A magnetic levitation device, comprising:
an electromagnet, magnetically levitating a supported body by a magnetic force and an electromagnet coil wound around a core;
an electromagnet driving circuit, supplying an electromagnet current to the electromagnet coil, wherein the electromagnet current comprises a magnetic levitation control current component for magnetically levitating the supported body, and a carrier wave current component having a frequency band higher than that of the magnetic levitation control current component and for detecting a levitated position of the supported body;
a levitated position detecting circuit, detecting the carrier wave current component and generating a levitated position signal of the supported body;
a magnetic levitation control circuit, inputting a current command of the magnetic levitation control current component to the electromagnet driving circuit based on the levitated position signal;
wherein the electromagnet coil has a primary coil and a secondary coil connected in parallel with the primary coil, and
an interrupting circuit connected in series with the secondary coil, the carrier wave current component passing therethrough and interrupting the magnetic levitation control current component.

\* \* \* \* \*